Aug. 25, 1931.  F. G. WITHROW  1,820,720
SERVICE BRAKE LEVER SILENCER
Filed Oct. 21, 1929
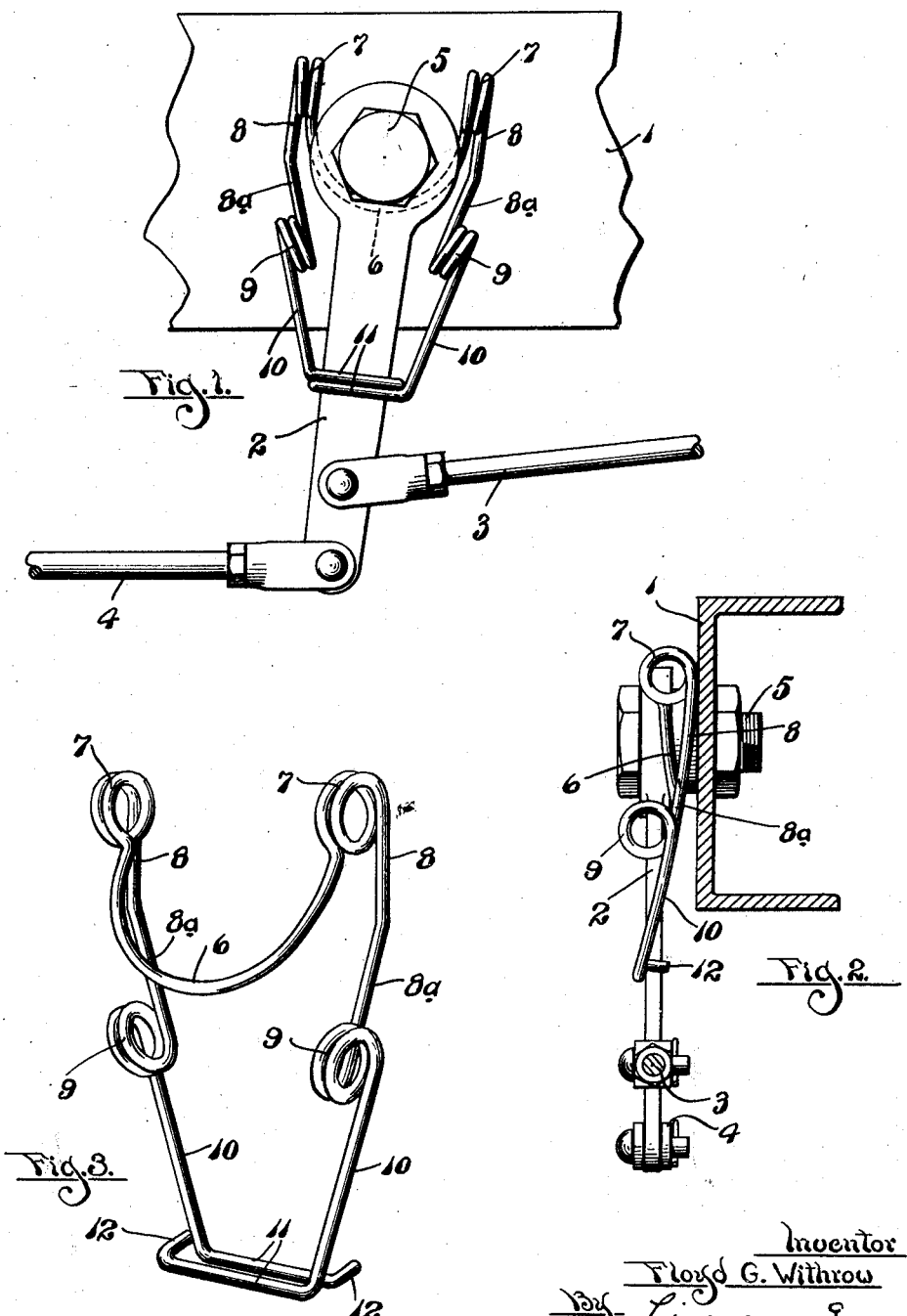

Patented Aug. 25, 1931

1,820,720

UNITED STATES PATENT OFFICE

FLOYD G. WITHROW, OF GRAND RAPIDS, MICHIGAN

SERVICE BRAKE LEVER SILENCER

Application filed October 21, 1929. Serial No. 401,337.

This invention relates to a service brake arm silencer, and is particularly concerned with a means for preventing noise and rattle at a pivot joint where an arm is pivotally mounted on and depends from a side chassis frame member of an automobile, to the lower portion of which arm brake rods are connected leading to the front and rear for operative association with the service brakes for the wheels at the side of the car. It is to be understood that one of these idler arms pivotally depends from each side member of the chassis frame. However, a description with respect to one of said arms and silencer device which I have provided for association therewith will serve for both.

An understanding of the invention for eliminating and obviating noises, such as rattling or the like at the pivot where the arm is connected to the chassis frame member, may be had from the following description taken in connection with the accompanying drawings in which, Fig. 1 is a fragmentary elevation of a chassis side frame member and brake rods showing the idler arm pivoted to the frame member and the silencer associated in connection therewith.

Fig. 2 is an end elevation partly in section of the construction shown in Fig. 1 and, Fig. 3 is a perspective view of the silencer device of my invention.

Like reference characters refer to like parts in the different figures of the drawings.

The side members of the chassis frame of an automobile, indicated at 1, are of channel form and the idler arm 2 to which the brake rods 3 and 4, one extending forward and the other to the rear, are pivotally connected, is pivotally suspended at its upper end from the web of the channel, a pivot bolt 5 passing through the upper end of the arm 2 and said channel web. The pivotal movements of the arm 2 in the course of time causes looseness whereupon there is a liability of undesirable rattling noises when the car is driven, and in my invention it is designed to obviate and silence noises of such character.

The silencing device which I have constructed for this purpose is formed from a length of relatively heavy resilient wire rod which, adjacent its middle portion, is formed into a curved loop or U-shaped bend 6, the sides of which extend upwardly and which at their upper ends are continued and formed into spring coils 7. From these coils sections 8 the wire extends downwardly, their lower portions being bent or converged inwardly, as at 8a, each being then continued in a second spring coil 9 from which downwardly and inwardly converging sections 10 extend. Each of the sections 10 at its lower end is bent so as to continue as a horizontal section 11. The two sections 11 lie closely adjacent each other and each of the sections 11 terminates in a right angle terminal section 12 as shown.

The silencer of the construction described is applied by inserting the loop 6 upwardly between the arm 2 and the channel web, the coils 7 bearing against the outer side of the web as shown. The depending sections 8 and 10 with the intermediate coils 9 are bent or sprung outwardly and the horizontal sections 11 are brought to lie against the outer side of the arm 2, the terminal sections 12 lying at the edges of said arm.

When thus applied the device is sprung and distorted out of normal form so that a considerable spring pressure is exerted by the device upon the arm at its upper end, tending to maintain the arm snugly against the head of the bolt 5 and eliminating any looseness in the pivotal connection which would produce rattle. At the same time the spring pressure of the sections 11 against the arm 2 serves to help maintain the device in the position at which it is applied.

The construction described has proven very satisfactory for silencing rattling noises which would otherwise occur by reason of the pivotal connection of the arm 2 to the chassis frame member. The construction described serves this purpose very satisfactorily. It is of relatively simple construction, easily manufactured and applied without the use of tools and without the necessity of employing skilled labor. The invention is defined in the appended claims and is to be considered comprehensive of all forms of structures coming within their scope.

I claim:

1. A device of the class described, made from a single length of spring material and formed at its middle portion into a U-shaped loop, the ends of said loop being continued and immediately formed into spring coils, sides extending from said coils at an acute angle to the plane of the loop, additional spring coils formed intermediate the ends of said sides, horizontal sections turned inwardly and lying alongside each other from the ends, of said sides, each of said sections at its end being bent at right angles to provide a terminal lip, for the purposes described.

2. A device of the class described formed from a single length of resilient spring wire comprising, a curved substantially U-shaped loop at the middle portion of said wire, said loop being located in a plane inclined to the vertical spring coils formed at the upper ends of the legs of said loop, substantially vertical sides extending downwardly from said coils, a second series of coils formed intermediate the ends of said sides, said second series of coils being farther from the first mentioned coils than the outer end of the U-shaped loop is from the first mentioned coils, horizontal sections bent inwardly to lie alongside of each other from the lower ends of the sides, and terminal lips formed at the ends of the horizontal sections bent substantially at right angles thereto.

3. In combination, a motor vehicle chassis side frame member, an arm pivotally connected at its upper end depending from said side frame member, a silencer device of spring material disposed at its upper end portion between the arm and the frame member and comprising a spring loop bearing against said arm at its inner side adjacent said pivot, spring coils at the upper end of the loop, sides extending downwardly from said coils bearing against the chassis frame member, and horizontal sections at the lower ends of said sides lying alongside each other and against the outer side of said arm, said horizontal sections being provided with terminal means extending inwardly along the edges of said arm.

In testimony whereof I affix my signature.

FLOYD G. WITHROW.